US007594022B2

(12) United States Patent
Warren et al.

(10) Patent No.: US 7,594,022 B2
(45) Date of Patent: Sep. 22, 2009

(54) REGULATING CLIENT REQUESTS IN AN ELECTRONIC MESSAGING ENVIRONMENT

(75) Inventors: Joseph R. Warren, Renton, WA (US); Robert R. Novitskey, Redmond, WA (US); Amit Kripalani, Bellevue, WA (US); Alexander C. Dun, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 859 days.

(21) Appl. No.: 10/828,760

(22) Filed: Apr. 21, 2004

(65) Prior Publication Data

US 2005/0267980 A1 Dec. 1, 2005

(51) Int. Cl.
*G06F 15/16* (2006.01)
(52) U.S. Cl. .................... 709/229; 709/227
(58) Field of Classification Search ............ 709/203, 709/229, 232–235, 227
See application file for complete search history.

(56) References Cited

U.S. PATENT DOCUMENTS

| | | | | |
|---|---|---|---|---|
| 5,046,002 A * | 9/1991 | Takashi et al. | ............... | 707/8 |
| 5,604,869 A * | 2/1997 | Mincher et al. | ............ | 709/232 |
| 5,832,218 A * | 11/1998 | Gibbs et al. | ............ | 709/203 |
| 5,963,945 A * | 10/1999 | Pal | ............. | 707/10 |
| 6,006,269 A * | 12/1999 | Phaal | ............. | 709/227 |
| 6,035,324 A * | 3/2000 | Chang et al. | ............. | 709/203 |
| 6,055,564 A * | 4/2000 | Phaal | ............. | 709/207 |
| 6,351,821 B1 * | 2/2002 | Voth | ............. | 713/600 |
| 6,360,270 B1 * | 3/2002 | Cherkasova et al. | ......... | 709/229 |
| 6,799,276 B1 * | 9/2004 | Belissent | ............. | 726/14 |
| 7,043,561 B2 * | 5/2006 | Hosomi | ............. | 709/235 |
| 2002/0138613 A1 * | 9/2002 | Garg et al. | ............. | 709/225 |
| 2002/0188738 A1 * | 12/2002 | Gray | ............. | 709/229 |
| 2003/0126198 A1 * | 7/2003 | Tenereillo et al. | ............. | 709/203 |
| 2003/0188013 A1 * | 10/2003 | Nishikado et al. | ............. | 709/238 |
| 2004/0199646 A1 * | 10/2004 | Susai et al. | ............. | 709/227 |
| 2004/0267878 A1 * | 12/2004 | Osias | ............. | 709/203 |
| 2005/0102393 A1 * | 5/2005 | Murray et al. | ............. | 709/224 |
| 2005/0256968 A1 * | 11/2005 | Johnson | ............. | 709/232 |
| 2007/0016639 A1 * | 1/2007 | Mukundan et al. | ............. | 709/203 |

OTHER PUBLICATIONS

Anca I.D. Bucur and DIck H.J. Epema, "The Influence of the Structure and Sizes of Jobs on the Performance of Co-Allocation", 2000, Springer-Verlag, Lecture Notes in Computer Science, vol. 1911, pp. 154-173.*

* cited by examiner

*Primary Examiner*—Aaron Strange
(74) *Attorney, Agent, or Firm*—Workman Nydegger

(57) ABSTRACT

The present invention is directed to regulating client requests in an electronic messaging environment. A client sends a data request to a messaging server. The messaging server receives the client data request and determines that the messaging server is unable to process the client data request. The messaging server adaptively generates a wait hint and sends a server response that includes the adaptively generated wait hint. The client receives the server response including the adaptively generated wait hint. The client waits a specified wait time in accordance with the adaptively generated wait hint to reduce the load on the messaging server. The client resends the data request subsequent to waiting the specified wait time.

27 Claims, 4 Drawing Sheets ical Area Network (e.g., operating at 100 MB/s) can be
configured as online clients.

REGULATING CLIENT REQUESTS IN AN ELECTRONIC MESSAGING ENVIRONMENT

BACKGROUND OF THE INVENTION

1. The Field of the Invention

The present invention relates to electronic messaging. More specifically, the present invention relates to regulating client requests in an electronic messaging environment.

2. Background and Related Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another to form both wired and wireless computer networks over which the computer systems can communicate electronically to share data. As a result, many tasks performed at a computer system (e.g., voice communication, exchanging electronic messages, electronic conferencing, web browsing) include electronic communication between a number of computer systems via wired and/or wireless computer networks.

In particular, the exchange of electronic messages has become an important method for communicating. Computer system users often send and receive electronic messages (e.g., electronic mail messages, instant messages, faxes, news group postings, etc.,) to exchange information with one another. For example, to send an electronic mail message (and potentially other message related content), a sending user typically selects a new message option from within an electronic mail application. In response to the selection, the electronic mail application displays one or more fields (e.g., a To field, a Body field, etc.) that can receive user entered data. The sending user then enters data (e.g., at a keyboard) into the displayed fields. The sending user can also select other message related data, such as, for example, a file attachment or hyperlink, that is to be included in the electronic mail message. When appropriate, the sending user can save the electronic mail message as a draft or send the electronic mail message to a recipient user (e.g., by selecting the appropriate "save" or "send" control within the electronic mail application). Sending the electronic mail message results in the electronic mail message being routed from a sending computer system, through a sending mail server, across a computer network (e.g., the Internet), to a receiving mail server that stores electronic mail messages for a recipient user.

The recipient user can subsequently use an electronic mail application to access the electronic mail message from the receiving mail server. Based at least in part on environment, electronic mail applications can be configured to access electronic mail messages differently. For example, electronic mail applications can be configured to access electronic mail messages directly from a server without caching accessed electronic mail messages (or message related content) at the client (which may be referred to as a "non-cached" or "online" clients). That is, accessed electronic mail messages remained stored only at the server.

Thus, each request for access to an electronic mail message (even the same electronic mail message) results in network communication between the client and the server. Electronic mail applications that have more permanent network connections and higher available bandwidth are often configured to operate as online clients. For example, electronic mail applications resident in personal computers connected to a corporate Local Area Network (e.g., operating at 100 MB/s) can be configured as online clients.

Mail servers are typically limited (either through administrator configuration or available server resources) to specified a number of requests that be simultaneously processed. Since online clients typically request relatively small amounts of message related content per request (e.g., one electronic message), corresponding mail servers can process online client requests relatively efficiently and resources are more quickly freed-up to process other requests.

Unfortunately, online mode may not be acceptable for electronic mail applications having less permanent network connections. For example, mobile devices may have sporadic and limited network access depending on the physical location of the mobile device user. Providing access to electronic mail messages (and message related content) only when the mobile device has an active network connection may be unacceptable to the mobile device user. Thus, electronic mail applications with limited network access can be configured to download and store (or cache) all of a user's electronic mail messages at the client (which may be referred to as a "cached client") when a network connection is available. Accordingly, cached clients can subsequently access the stored electronic messages even when the cached client is offline. When operating offline, a cached client can also store newly drafted electronic messages for subsequent upload and delivery when a network connection becomes available.

However, since cached clients request increased amounts of message related content at once (e.g., all of a user's electronic mail messages), a request from a cached client can consume significantly more server resources and take significantly longer to process. Accordingly, some mechanisms have been developed to reduce the number of electronic mail messages and amount of message related content needed to satisfy a request from a cached client. For example, a cached client can be synchronized with a mail server such that only electronic mail messages and message related content that has changed since the cached client last accessed the server is returned to the client in response to a request. However, depending on the frequency with which electronic messages are received and the amount of message related content in received electronic messages, a cached client request can still result in a relatively large amount of message related content having to be downloaded to a cached client. Accordingly, even requests from synchronized cached clients can consume significant server resources and take a server a relatively long time to process. Further, synchronization logic for identifying the electronic mail messages and message related content that is to be returned in response to a cached client request can consume additional server resources.

In many environments, electronic mail servers are configured to accept requests from both online/cached clients and non-cached clients. For example, when in the office, a user can use a personal computer having an electronic mail application configured to operate as an online client. On the other hand, when traveling, the user can use a Personal Digital Assistant ("PDA") having an electronic mail application configured to operate as a cached client. Thus, depending on the number of users authorized to access mail from a mail server, the mail server may, from time to time, simultaneously process requests from both cached and non-cached clients. In some environments, such as, for example, at a corporate mail server, significant numbers of requests from both cached and non-cached clients are simultaneously processed.

Mail servers typically process requests as the requests are received. When a maximum number of requests are simultaneously being processed, any further requests will fail and message related content is not returned from the server to a requesting client. Thus, there is always some potential, based on mail server load, that a mail server will reject a client request for message related content. The possibility of client requests being rejected significantly increases when a mail server is simultaneously processing a number of, typically longer duration, cached client requests. That is, cached clients can potentially overload a mail server with requests for increased amounts of message related content and complex synchronization operations such that the mail server is essentially unavailable to other (online and/or cached) clients. Rejection of client requests can degrade the user experience, for example, causing an online client to not properly respond to a user command (e.g., to open an electronic mail message) or preventing a cached client from synchronizing. Therefore, what would be advantageous are mechanisms for regulating client requests in an electronic messaging environment.

BRIEF SUMMARY OF THE INVENTION

The foregoing problems with the prior state of the art are overcome by the principles of the present invention, which are directed to regulating client requests in an electronic messaging environment. A plurality of clients is network connectable to a messaging server. A client sends a data request to the messaging server. The messaging server receives the client data request and determines that the messaging server is unable to process the client data request (e.g., the messaging server is bust, lacks available resources, etc).

The messaging server adaptively generates a wait hint. Generally, a wait hint is data that represents a client is to wait some time before resending the client data request thereby reducing the load at the messaging server. An adaptively generated wait hint can be based on messaging server load, the configuration of a wait hint generation algorithm, how many times a client has previously sent the client data request, etc. For example, if a client repeatedly sends the same client data request, the messaging server can adaptively increase the wait time represented by the wait hint each time the client data request is received. The server sends a server response that includes the adaptively generated wait hint.

The client receives the server response including the adaptively generated wait hint. The adaptively generated wait hint indicates to the client that the messaging server was unable to process the data request. The client waits a specified wait time in accordance with the adaptively generated wait hint to thereby reduce the load on the messaging server. The client resends the data request subsequent to waiting the specified wait time.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
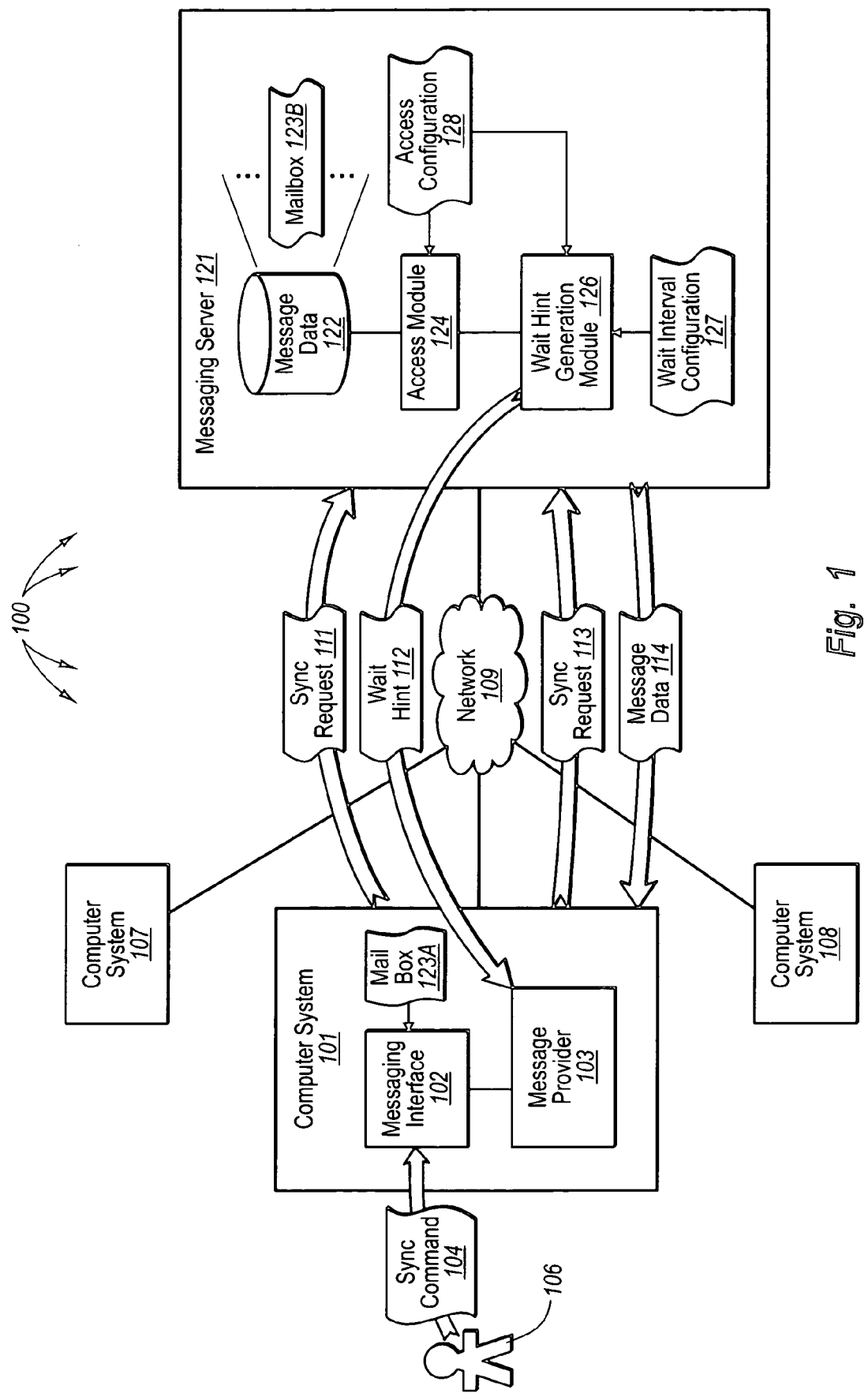
FIG. 1 illustrates example computer architecture that facilitates regulating client requests in accordance with the present invention.

The principles of the present invention relate to systems, methods, and computer program products for regulating client requests in an electronic messaging environment. Embodiments within the scope of the present invention include computer-readable media for carrying or having computer-executable instructions or data structures stored thereon. Such computer-readable media may be any available media, which is accessible by a general-purpose or special-purpose computing system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computing system.

In this description and in the following claims, a "network" is defined as one or more data links that enable the transport of electronic data between computing systems and/or modules. When information is transferred or provided over a network or another communications connection (either hardwired, wireless, or a combination of hardwired or wireless) to a computing system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computing system or special-purpose computing system to perform a certain function or group of functions. The computer executable instructions may be, for example, binaries, intermediate format instructions such as assembly language, or even source code.

In this description and in the following claims, a "computing system" is defined as one or more software modules, one or more hardware modules, or combinations thereof, that work together to perform operations on electronic data. For example, the definition of computing system includes the hardware components of a personal computer, as well as software modules, such as the operating system of the personal computer. The physical layout of the modules is not important. A computing system may include one or more computers coupled via a network. Likewise, a computing system may include a single physical device (such as a mobile phone or Personal Digital Assistant "PDA") where internal modules (such as a memory and processor) work together to perform operations on electronic data.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Those skilled in the art will appreciate that the invention may be practiced in network computing environments with many types of computing system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates example computer architecture 100 that facilitates regulating client requests in accordance with the present invention. Computer system 101 includes messaging interface 102 and message provider 103. Messaging interface 102 and message provider 103 can be part of an electronic messaging application or can be separate modules that interact with an electronic messaging application. Message provider 103 can include or interface with a provider side algorithm that attempts to improve user experience and/or reduce server load. An entity, such as, for example, user 106, can send message related commands to messaging interface 102 (e.g., using an input device) and access message related data that is output through messaging interface 102 (e.g., at a monitor or speakers). Computer systems 107 and 108 can also include a messaging interface for interfacing with message related data.

Messaging server 121 includes message data 122, access module 124, and wait hint generation module 126. Messaging server 121 can receive client requests for data that is stored in message data 122 (e.g., electronic mail messages corresponding to mail box 123B). When appropriate, messaging server 121 can return requested data to a client. When a data request is received, access module 124 can determine if messaging server 121 is currently able to process the data request. Access module 124 can refer to a credentials database, measure current server load, refer to access configuration rules, etc., when determining if a request can be processed.

For example, messaging server 121 can be limited to maximum number of client requests that can be processed in parallel. The maximum number of parallel client requests can be limited as a result of available system resources, for example, system memory available at messaging server 121. Alternately, an administrator can limit the maximum number of parallel client requests through adjustment of configuration settings at messaging server 121. When the maximum number of parallel client requests is being processed, any further requests are not processed and messaging server 121 can return an indication that messaging server 121 is busy.

Computer systems 101, 107, 108, and messaging server 121 are connected to network 109. Network 109 can be virtually any type of network, such as, for example, a Local Area Network ("LAN"), Wide Area Network ("WAN"), or even the Internet. Computer systems 101, 107, 108, and messaging server 121 can exchange electronic messages with one another and with other computer systems (not shown) that are connected to network 109. For example, messaging server 121 can be configured as an electronic mail server for users of computer systems 101, 107, and 108 (as well as other computer systems connected to network 109). Accordingly, from time to time, computer systems 101, 107, and 108 (as well as other computer systems connected to network 109) can send requests for corresponding message related data.

Some computer systems can include cached mode clients and other computer systems can include online mode clients. Thus, some computer systems (cached) can connect to messaging server 121 to attempt to access message related data for the purpose of storing the accessed message related data (e.g., to synchronize with messaging server 121). Cached mode clients can request message related data even when the message related data is not to be immediately output at a messaging interface.

On the other hand, other computer systems (online) can connect to messaging server 121 to access message related data but do not store the accessed message related data. Since these other computer systems do not store message related data, these other computer systems may issue more frequent requests. For example, each time message related data is to be output at a messaging interface (even the same message related data) a new request for the message related data is issued.

Messaging server 121 may be designated as a messaging server for more users than a specified maximum number of client requests that can be processed in parallel. For example, messaging server 121 may be configured as a messaging server for several thousand users but is configured to process only a few hundred client requests in parallel. Thus, there is some chance that at the time a new client request is received, messaging server 121 is already processing the specified maximum number of client requests that can be processed in parallel.

Figure 2:
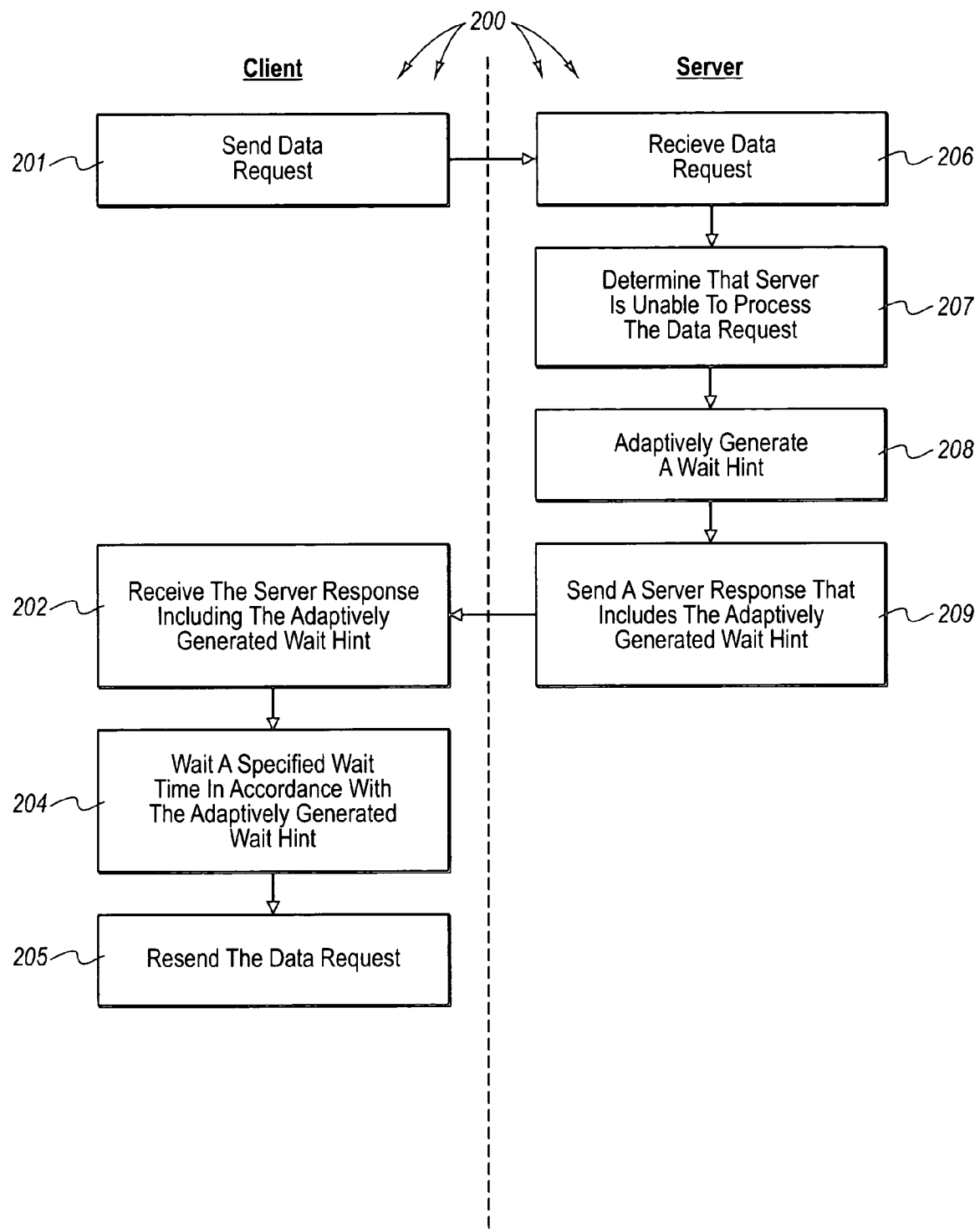
FIG. 2 illustrates a flowchart of an example method for regulating client requests in accordance with the present invention.

FIG. 2 illustrates a flowchart of an example method 200 for regulating client requests in accordance with the present invention. The method 200 will be described with respect to the computer systems, messaging server, network, and components depicted in computer architecture 100. The method 200 includes an act of sending a data request (act 201). For example, in response to sync command 104, computer system 101 can send sync request 111 to messaging server 121. Sync request 111 can be a request to synchronize a portion of mail box 123A (a local copy of a mailbox) with a corresponding portion of mail box 123 B (a remote copy of the mail box).

The method 200 includes an act of receiving a data request (act 206). For example, messaging server 121 can receive sync request 111 from computer system 101.

The method 200 includes an act of determining that the server is unable to process the data request (act 207). For example, access module 124 can determine that messaging server 121 is unable to process sync request 111. Access module 124 can determine that messaging server 121 is unable to process a data request based on the configuration of messaging server 121. For example, access module 124 can make such a determination when messaging server 121 is already processing a specified maximum number of data requests in parallel.

When determining if messaging server 121 can process a data request, access module 124 can refer to measurements of the available resources of messaging server 121 (e.g., performance monitors), access configuration 128, wait generation module 126, etc. Access configuration 128 can include configuration parameters (e.g., set by an administrator) that indicate a maximum number of data requests that can be processed in parallel. Thus, even when messaging server 121 has available resources for processing a data request, access configuration 128 can dictate that the data request is not to be processed.

The method 200 includes an act of adaptively generating a wait hint (act 208). An adaptively generated wait hint can represent that a corresponding client is to wait a specified wait time before resending the data request. For example, wait hint generation module 126 can adaptively generate wait hint 112 (corresponding to sync request 111). Wait hint 112 can represent that computer system 101 is to wait a specified wait time before resending sync request 111. Wait hint generation module 126 can refer to access configuration 128 and/or wait interval configuration 127 when adaptively generating a wait hint. Wait interval configuration 127 can indicate how wait hints are to be generated.

Wait interval configuration 127 can include parameters and parameter values (e.g., name/value pairs) for configuring wait hint generation. For example, wait interval configuration can include values for first through tenth wait hints. Wait interval configuration 127 can also include a value indicating how many times the same request can be delayed before the data request is processed. For example, a value in wait interval configuration 127 can indicate that after ten wait hints have been generated for a data request (i.e., the data request has been received and not processed ten times) the data request is to be processed (even if message server 121 is busy). Accordingly, even when messaging server 121 is under increased load, data requests will eventually be processed.

In some embodiments, wait hint generation module 126 is based on an algorithm that adaptively generates wait hints for causing a corresponding client to wait longer each time the same data request is issued but messaging server 121 is unable to process the data request. For example, wait hint generation module 126 can generate a wait hint indicating a two millisecond ("ms") delay the first time the data request is received, a wait hint indicating a five ms delay the second time the data request is received, a wait hint indicating a ten ms delay the third time the data request is received, etc. However, virtually any algorithm can be used to generate wait hints.

For example, an algorithm can be configured to cause successive wait hints to indicate the same wait time (e.g., five ms), to indicate a linearly increased wait time (e.g., three ms, five ms, seven ms, etc.), or to indicate an exponentially increased wait time (e.g., two ms, four ms, eight ms, etc.). In some embodiments, an algorithm can be configured to cause successive wait hints to similarly indicate decreased wait times (e.g., linearly decreasing or exponentially decreasing).

Although wait interval configuration 127 is depicted separate from wait hint generation module 126, it should be understood that wait interval configuration 127 can be included in wait hint generation module 126. For example, in some embodiments, wait interval configuration 127 can be hardcoded into wait generation module 126. However, in other embodiments, wait interval configuration 127 is external configuration data. In these other embodiments, an administrator can alter parameter values in wait interval configuration 127 to tune messaging server 121 as desired. In yet other embodiments, some portions of wait interval configuration 127 are included in wait hint generation module 126, while other portions wait interval configuration 127 are external to wait hint generation module 126.

Wait hints can be generated based on the connection speed of the client. For example, wait hint generation module can be configured to apply varying degrees of throttling to data requests depending on the connection speed of the client. Since clients with higher connection speeds potentially receive data faster, wait hints indicating longer specified wait times can be generated for clients with higher connection speeds. On the other hand, since clients with lower connection speeds receive data more slowly, wait hints indicating shorter specified wait times are generated for clients with lower connection speed. Thus, wait hints can be utilized to balance the data returned in response to client requests from a plurality of clients of varied connections speeds.

The method 200 includes an act of sending a server response that includes the adaptively generated wait hint (act 209). For example, messaging server 121 can send wait hint 112 to computer system 101. The method 200 includes an act of receiving the server response including the adaptively generated wait hint (act 202). For example, message provider 103 can receive wait hint 112 from messaging server 121. Message provider 103 can interface with or include a provider side algorithm that attempts to improve the user experience of user 106 and/or attempts to reduce the load of messaging server 121.

Figure 4:
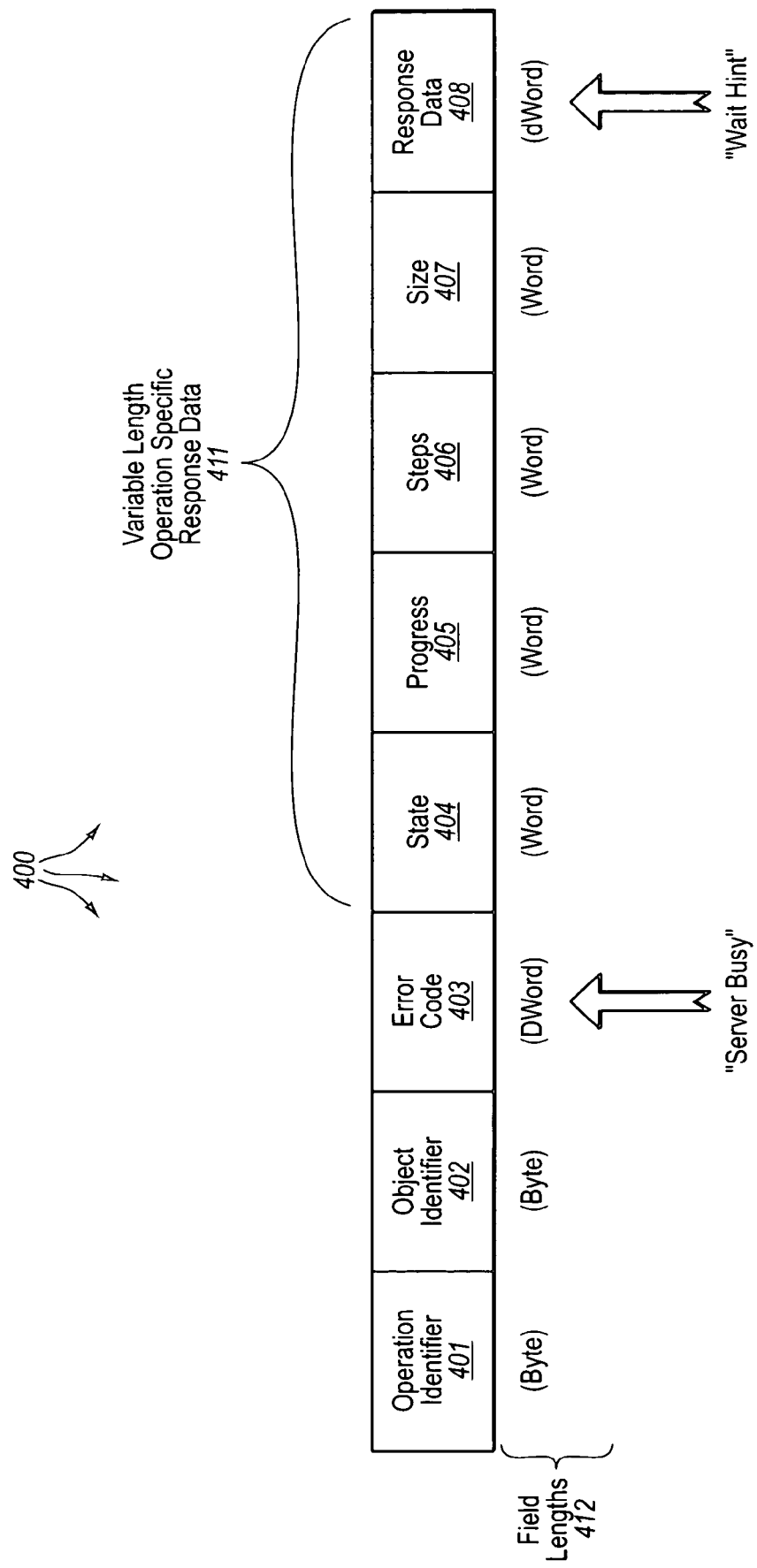
FIG. 4 illustrates an example server response message format for sending a wait hint to a client.

FIG. 4 illustrates an example server response message format 400 for sending a wait hint to a client. Field lengths 412 represent example lengths for each field of the example server response message format 400. For example, operation identifier 401 can be byte in length, error code 403 can be a double word in length, and size 407 can be a word in length.

Operation identifier 401 indicates the type of operation that was requested (e.g., from a client). Object identifier 402 indicates a server object the operation is being performed on. Error code 403 indicates a resultant error code. For example, in response to message server 121 being unable to process sync request 111, error code 403 can indicate a "server busy" error code. Generally, based on the operation identified by operation identifier 401, a server response message can include variable length operation specific response data 411. For example, state 404, progress 405, steps 406, size 407, and response data 408 can include data associated with the operation identified in operation identifier 401. In response to message server 121 being unable to process sync request 111 (e.g., when error code 403 indicates "server busy"), response data 408 can indicate a "wait hint" (e.g., wait hint 112).

Optionally the method 200 can include an act of causing a user-interface to indicate that the data request is still being processed. For example, message provider 103 can cause messaging interface 102 to indicate that sync request 111 is still being processed. Thus, to entity 106 it can appear as if sync request 111 is being processed, even though messaging server 121 was unable to process sync request 111. Accordingly, embodiments of the present invention may or may not attempt to notify a user that processing of a data request (e.g., for electronic messages) is being delayed.

The method 200 includes an act of waiting a specified wait time in accordance with the adaptively generated wait hint (act 204). For example, message provider 103 (e.g., through a provider side algorithm) can wait a specified wait time in accordance with wait hint 112. A specified wait time can be randomized such that a number of clients given the same wait hint do not attempt to resend data requests at the same time. For example, a wait hint can indicate a specified wait time of 16 ms. However, to reduce the chances of resending a request at the same time as one or more other clients that receive the same wait hint, a client can wait a specified wait time of 16.5 ms (i.e., adding a randomly generated value of 0.5 ms). Waiting a specified amount of time can reduce the load at messaging server 121.

In some embodiments, a user-interface provides no indication that the client is waiting to resend a data request in response to receiving a wait hint. Thus, during the specified wait time a user may be unaware that the client even received a wait hint. For example, user 106 may not even be aware that wait hint 112 was received and that message provider 103 is waiting to resend a sync request. In other embodiments, a user-interface is updated to indicate that a data request is being processed. Thus, when a server is busy, a user requesting data from the server can be notified that the request is being processed. For example, message provider 103 can update messaging interface 102 to indicate that a sync request is being processed (even during the specified wait time).

The method 200 includes an act of resending the data request subsequent to wait the specified wait time (act 205). For example, computer system 101 can send sync request 113 that requests synchronization of the same data requested in sync request 111. Sync request 113 can be a request to synchronize a portion of mail box 123A (a local copy of a mailbox) with a corresponding portion of mail box 123 B (a remote copy of the mail box).

Messaging server 121 can receive sync request 113. If access module 124 determines that messaging server 121 can process the request, message data 114 (e.g., a portion of mail box 123B) is returned to computer system 101. In response to message data 114, messaging interface 102 can be updated to indicate that message 114 was received.

On the other hand, if access module 124 determines that messaging server 121 can not process the request, wait hint generation module can generate a new wait hint. Messaging server 121 can send the new wait hint to computer system 101. Message provider 103 can receive the new wait hint and wait a specified wait time in accordance with the new wait hint before resending the sync request. Alternately, access module 124 can indicate that the sync request 113 has already been caused to wait a threshold number of times and that sync request 113 is to be processed.

In some embodiments, communication between computer systems is facilitated through protocols built upon remote procedure calls ("RPC's"). After establishing an RPC communication session (e.g., using Transmission Control Protocol ("TCP")), a client sends request buffers to a server through an RPC call. The client RPC call contains a request buffer and an output buffer or alternately a shared input/output buffer. A request buffer (or shared input/output buffer) contains one more request operations. Each request operation contains a request operation identifier (e.g., similar to operation identified 401), followed by specified data fields associated with the requested operation.

The server processes requests operations in order and builds a response buffer (or fills a portion of a shared input/output buffer) that is sent back to the client in response to the RPC call. Each request has a corresponding response in the response buffer (or filled portion of the shared input/output buffer), which includes an operation identified (e.g., operation identifier 401), a server object index (e.g., object identifier 402), a resultant error code (e.g., error code 403), and variable length operation specified response data (e.g., variable length operation specified data 411).

With respect to data synchronization, the server can throttle a specific operation contained in the input buffer (or shared input/output buffer). For example, when a request operation used to stream synchronization data (e.g., electronic messages and folders) needs to be throttled back, the server can return a "server busy" error code and a "wait hint" in a response buffer (or portion of a shared input/output buffer). The client (e.g., message provider 103) detects the "server busy" error code and reads the "wait hint" from the buffer. The client suspends background synchronization for a specified wait time (a "back-off" time) in accordance with the "wait hint". When the specified wait time expires, the client attempts the specific operation again.

Embodiments of the present invention can facilitate regulating client requests based on the load at a messaging server. Further, client requests are regulated such that the user experience is not significantly degraded. That is, instead of receiving a failure message, a user receives no message at all or, when appropriate, is presented with an indication that a request is being processed. Resending a request in response to a "server busy" error code is performed automatically and without user intervention. Thus, a user is relieved from having to manually and repeatedly send a data request. Accordingly, embodiments of the present invention can provide a better user experience with requesting message related data (or even other types of data) from a server.

Figure 3:
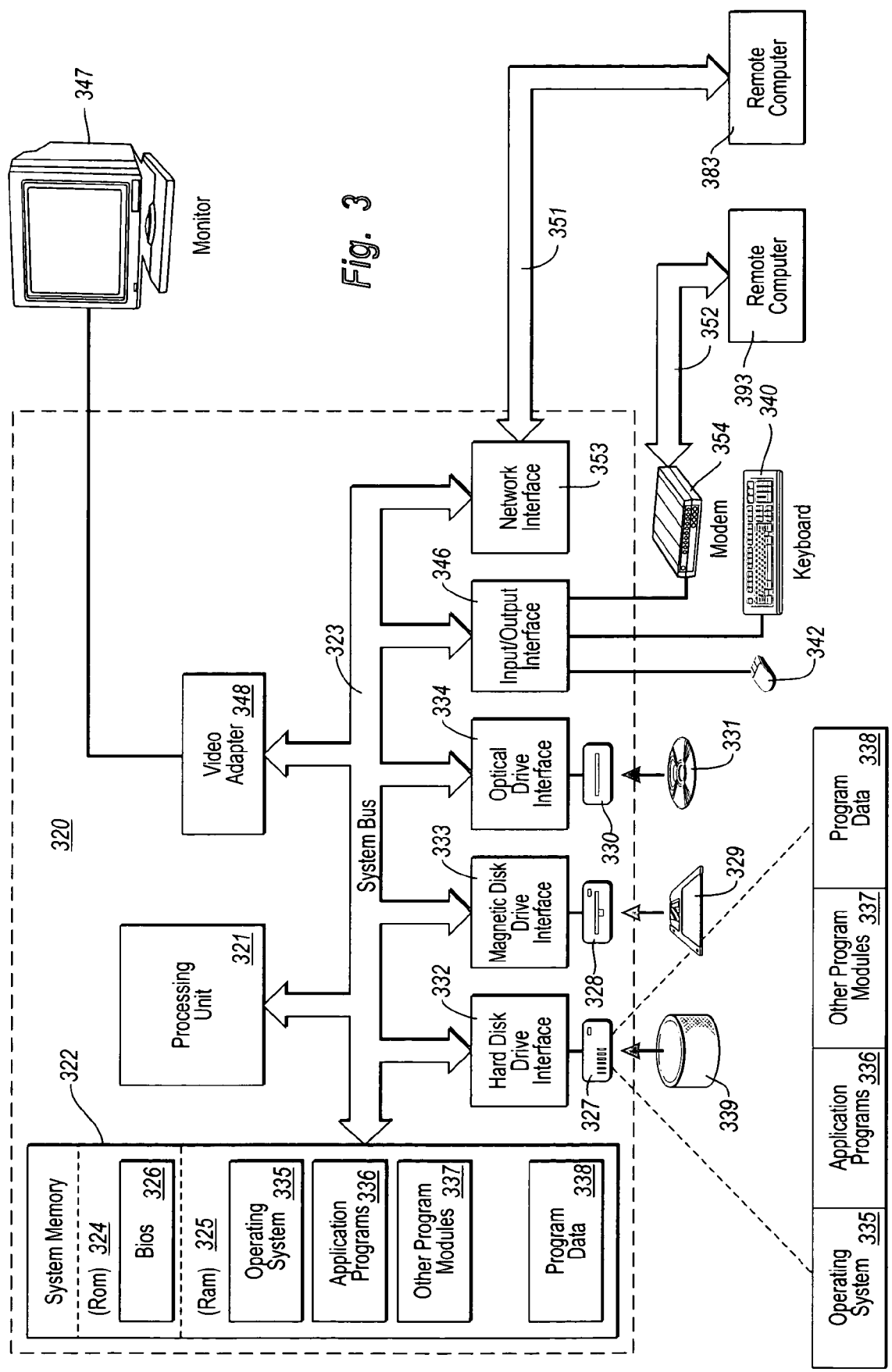
FIG. 3 illustrates a suitable operating environment for implementing the principles of the present invention.

FIG. 3 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 3, an example system for implementing the invention includes a general-purpose computing device in the form of computer system 320, including a processing unit 321, a system memory 322, and a system bus 323 that couples various system components including the system memory 322 to the processing unit 321. Processing unit 321 can execute computer-executable instructions designed to implement features of computer system 320, including features of the present invention. The system bus 323 may be any of several types of bus structures including a memory bus or memory controller, a peripheral bus, and a local bus using any of a variety of bus architectures. The system memory includes read only memory ("ROM") 324 and random access memory ("RAM") 325. A basic input/output system ("BIOS") 326, containing the basic routines that help transfer information between elements within computer system 320, such as during start-up, may be stored in ROM 324. It may be that performance monitor 112 and event log 133 maintain corresponding performance data and event log data in RAM 325.

The computer system 320 may also include magnetic hard disk drive 327 for reading from and writing to magnetic hard disk 339, magnetic disk drive 328 for reading from or writing to removable magnetic disk 329, and optical disk drive 330 for reading from or writing to removable optical disk 331, such as, or example, a CD-ROM or other optical media. The magnetic hard disk drive 327, magnetic disk drive 328, and optical disk drive 330 are connected to the system bus 323 by hard disk drive interface 332, magnetic disk drive-interface 333, and optical drive interface 334, respectively. The drives and their associated computer-readable media provide non-volatile storage of computer-executable instructions, data structures, program modules, and other data for the computer system 320. Although the example environment described herein employs magnetic hard disk 339, removable magnetic disk 329 and removable optical disk 331, other types of computer-readable media for storing data can be used, including magnetic cassettes, flash memory cards, digital versatile disks, Bernoulli cartridges, RAMs, ROMs, and the like. Data point store 109 can be contained in one or more of these nonvolatile storage locations.

Program code means comprising one or more program modules may be stored on hard disk 339, magnetic disk 329, optical disk 331, ROM 324 or RAM 325, including an operating system 335, one or more application programs 336, other program modules 337, and program data 338. A user may enter commands and information into computer system 320 through keyboard 340, pointing device 342, or other input devices (not shown), such as, for example, a microphone, joy stick, game pad, scanner, or the like. These and other input devices can be connected to the processing unit 321 through input/output interface 346 coupled to system bus 323. Input/output interface 346 logically represents any of a wide variety of possible interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 347 or other display device is also connected to system bus 323 via video interface 348. Monitor 347 can display monochrome and/or color graphical objects, including text, generated by computer system 320. Other peripheral devices (not shown), such as, for example, speakers, printers, and scanners, can also be connected to computer system 320.

Computer system 320 is connectable to networks, such as, for example, an office-wide or enterprise-wide computer network, a home network, an intranet, and/or the Internet. Computer system 320 can exchange data with external sources, such as, for example, remote computer systems, remote applications, and/or remote databases over such networks.

Computer system 320 includes network interface 353, through which computer system 320 receives data from external sources and/or transmits data to external sources. As depicted in FIG. 3, network interface 353 facilitates the exchange of data with remote computer system 383 via link 351. Network interface 353 can logically represent one or more software and/or hardware modules, such as, for example, a network interface card and corresponding Network Driver Interface Specification ("NDIS") stack. Link 351 represents a portion of a network (e.g., an Ethernet segment), and remote computer system 383 represents a node of the network.

Likewise, computer system 320 includes input/output interface 346, through which computer system 320 receives data from external sources and/or transmits data to external sources. Input/output interface 346 is coupled to modem 354 (e.g., a standard modem, a cable modem, or digital subscriber line ("DSL") modem), through which computer system 320 receives data from and/or transmits data to external sources. As depicted in FIG. 3, input/output interface 346 and modem 354 facilitate the exchange of data with remote computer system 393 via link 352. Link 352 represents a portion of a network and remote computer system 393 represents a node of the network.

While FIG. 3 represents a suitable operating environment for the present invention, the principles of the present invention may be employed in any system that is capable of, with suitable modification if necessary, implementing the principles of the present invention. The environment illustrated in FIG. 3 is illustrative only and by no means represents even a small portion of the wide variety of environments in which the principles of the present invention may be implemented.

In accordance with the present invention, modules, such as, for example, messaging interface 102, message provider 103, access module 124, and wait hint generation module 126, as well as associated program data, such as, for example, sync command 104, mail boxes 123A and 123B, sync requests 111 and 113, message data 122, access configuration 128, wait interval configuration 127, wait hint 112, and message data 114, can be stored and accessed from any of the computer-readable media associated with computer system 320. For example, portions of such modules and portions of associated program data may be included in operating system 335, application programs 336, program modules 337 and/or program data 338, for storage in system memory 322.

When a mass storage device, such as, for example, magnetic hard disk 339, is coupled to computer system 320, such modules and associated program data may also be stored in the mass storage device. In a networked environment, program modules depicted relative to computer system 320, or portions thereof, can be stored in remote memory storage devices, such as, system memory and/or mass storage devices associated with remote computer system 393 and/or remote computer system 383. Execution of such modules may be performed in a distributed environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. At a computer system that is network connectable to a messaging server, the computer system configured to provide user access to data stored at the messaging server, a method for requesting data that provides an improved user experience when the messaging server is experiencing increased load, the method comprising:

an act of computer system sending a data request to the messaging server, the data request requesting that message related data for a user of the computer system be returned from the messaging server to the computer system;

an act of receiving a buffer from the messaging server, the buffer responsive to the data request from the messaging server, the buffer having plurality of data fields, including a error code field and a response data field, the error code field containing a server busy error code, the server busy error code indicating that the messaging server did not process the data request, the response data field containing an adaptively generated wait hint generated at the messaging server, the adaptively generated wait hint being an indication that the messaging server was unable to process the data request and indicating that the computer system is to wait a specified wait time before re-sending the data request, the adaptively generated wait hint generated by a wait hint generation algorithm at the messaging server, the wait hint generation algorithm configured to:

adaptively generate a wait hint each time the data request is received at the messaging server but not processed, each wait hint generated by the messaging server based on the message server tracking how many times the data request was previously received at the messaging server but not processed, up to a specified number of times the messaging server detects that the data request is received at the messaging server but not processed at the messaging server, after which the messaging server processes the data request to return the message related data in response to the data request such that the message server controls when delayed data requests are eventually processed even when the messaging server is busy;

an act of waiting the specified wait time before resending the data request requesting message related data for the user to thereby reduce the load on the messaging server; and an act of resending the data request subsequent to waiting the specified wait time.

2. The method as recited in claim 1, wherein the act of sending a data request to the messaging server comprises an act of sending a synchronization request.

3. The method as recited in claim 1, wherein the act of sending a data request to the messaging server comprises an act of issuing an RPC call.

4. The method as recited in claim 1, wherein the act of receiving a buffer including an adaptively generated wait hint comprises an act of receiving the buffer from the messaging server in response to an RPC call.

5. The method as recited in claim 4, wherein the act of receiving the buffer from the messaging server in response to an RPC call comprises an act of receiving a buffer that contains the wait hint in a variable length operation specific response data portion of the buffer.

6. The method as recited in claim 1, further comprising:
an act of the computer system randomizing the specified wait time included in the adaptively generated wait hint received from the server to reduce the chances of resending the next request requesting message related data for the user at the same time as one or more other different computer systems that also received the adaptively generated wait hint in response to requesting data from the messaging server; and wherein the act of waiting the specified wait time before resending the data request requesting message related data for the user comprises the act of waiting the randomized specified wait time before resending the data request; and wherein the act of resending the data request requesting message related data for the user subsequent to waiting the specified wait time comprises an act of resending the data request subsequent to waiting randomized specified wait time.

7. The method as recited in claim 1, wherein the act of waiting a specified wait time in accordance with the adaptively generated wait hint comprises an act of utilizing the wait hint at a client side module that attempts to improve user experience when interacting with the messaging server.

8. The method as recited in claim 1, wherein the act of resending the data request subsequent to waiting the specified time comprises reissuing an RPC call that was originally issued to send the data request.

9. The method as recited in claim 1, further comprising:
an act of receiving a synchronization command from a user.

10. The method as recited in claim 1, further comprising:
an act of receiving a second buffer, the second buffer including the error code field and the response data field, the error code field containing the server busy error code and the response data field containing a second adaptively generated wait hint subsequent to resending the data request after the specified wait time, the second adaptively generated wait hint being an indication that the messaging server was unable to process the resent data request, the second adaptively generated wait hint having a second different indicated wait time differing from the indicated wait time;

an act of waiting a second specified wait time before again resending the data request to thereby reduce the load on the messaging server, the second specified wait time based on the second different indicated wait time; and an act of again resending the data request subsequent to waiting the second specified wait time.

11. The method as recited in claim 1, further comprising:
an act of receiving message related data for the user subsequent to resending the data request; and
an act of updating a message interface to reflect that the message related data was received.

12. The method as recited in claim 1, further comprising:
an act of causing a message interface at the computer system to indicate that the data request is being processed so as to not give the user an impression that the messaging server was to busy to process the data request, even though the messaging server returned an adaptive wait hint in response to the data request.

13. At a computer system that is network connectable to a plurality of different clients, the computer system configured to process client data requests for user messaging data maintained at the computer system and return appropriate user messaging data to corresponding requesting clients, a method for regulating client requests so as to provide an improved user experience when the messaging server is experiencing increased load, the method comprising:

an act of receiving a client data request from a client, the client data request requesting that message related data for a user of the client be returned to the client;

an act of determining that the computer system is unable to process the client data request based on the current load of computer system, the current load indicative of resource consumption at the computer system as a result of the computer system sending message related data to other clients from among the plurality of different clients, the determination made subsequent to receiving the client data request;

an act of adaptively generating a wait hint for return to the client, the adaptively generated wait hint including an indicated wait time, the wait time indicating an amount of time to the client that the client is to wait before resending the client data request to thereby reduce the load at the computer system, the adaptively generated wait hint generated by a wait hint generation algorithm, the wait hint generation algorithm configured to:

adaptively generate a wait hint each time the client data request is received at the messaging server but not processed based on the messaging server tracking how many times the client data request was previously received but not processed, up to a specified number of times the messaging server detects that the data request is received at the message but not processed at the messaging server, after which the messaging server processes the client data request to return the message related data in response to the client data request such that the message server controls when delayed client data requests are eventually processed even when the messaging server is busy; and an act of sending a buffer to the client, the buffer responsive to the client data request, the buffer having a plurality of data fields including an error code field and a response data field, the error code field containing a server busy error code, the server busy error coding indicating that the messaging server did not process the client data request, the response data field containing the adaptively generated wait hint, the adaptively generated wait hint indicating to the client to wait the indicated wait time before resending the client data request.

14. The method as recited in claim 13, wherein the act of receiving a client data request from a client comprises an act of receiving a synchronization request.

15. The method as recited in claim 13, wherein the act of receiving a client data request from a client comprises an act of receiving an RPC call.

16. The method as recited in claim 13, wherein the act of determining that the computer system is unable to process the client data request comprises an act of determining that the computer system lacks the resources to process the client data request in parallel with other requests that are being processed.

17. The method as recited in claim 13, wherein the act of determining that the computer system is unable to process the client data request comprises an act of determining that the computer system is already processing a configured maximum number of requests that can be processed in parallel.

18. The method as recited in claim 13, wherein the act of adaptively generating a wait hint comprises an act of varying the indicated wait time between successive adaptively generated wait hints in accordance with the wait hint generation algorithm.

19. The method as recited in claim 18, wherein the act of varying the indicated wait time between successive adaptively generating wait hints in accordance with the wait hint generation algorithm comprises an act of increasing the indicated wait time for each successive wait hint corresponding to the same data request.

20. The method as recited in claim 18, wherein the act of adaptively generating a wait hint comprises an act of generating a wait hint in accordance with a wait hint generation algorithm that accesses external configurable parameter values.

21. The method as recited in claim 13, wherein the act of adaptively generating a wait hint comprises an act of generating a wait hint for a data request based on the connection speed of the client that sent the data request.

22. The method as recited in claim 13, wherein the act of sending a buffer that contains the adaptively generated wait hint to the client comprises an act of sending a buffer to the client in response to an RPC call.

23. The method as recited in claim 22, wherein the act of sending the buffer to the client in response to an RPC call comprises an act of sending a buffer that contains the wait hint in a variable length operation specific response data portion of the buffer.

24. The method as recited in claim 13, further comprising:
an act of receiving a resent client data request from the client, the resent client data request requesting the same data as the client request;
an act of determining that the computer system is again unable to process the resent client data request, subsequent to receiving the resent client data request;
an act of adaptively generating a second wait hint, the adaptively generated second wait hint including a second indicated wait time indicating a second amount of time the client is to wait before again resending the resent client data request to thereby reduce the load at the computer system, the seconding indicated wait time differing from the indicated wait time in accordance with the configuration of the wait hint generation algorithm; and an act of sending a second buffer to the client, the second buffer including the error code field and the response data field, the error code field containing the server busy error code and the response data field containing the adaptively generated second wait hint.

25. A computer program product for use at a computer system that is network connectable to a messaging server, the computer system configured to provide user access to data stored at the messaging server, the computer program product for implementing a method for requesting data that provides an improved user experience when the messaging server is experiencing increased load, the computer program product comprising one or more computer storage media having stored thereon computer-executable instructions that, when executed by a processor, cause the computer system to perform the following:
send a data request to the messaging server, the data request requesting that message related data for a used of the computer system be returned from the messaging server to the computer system;
receive data responsive to the data request in a Remote Procedure Call (RPC) response buffer from the messaging server, the RPC response buffer having a plurality of data fields, including an error code field and a response data field, the error code field containing a server busy error code, the server busy error code indicating that the messaging server did not process the data request, the response data field containing an adaptively generated wait hint, the response data field included in a variable length operation specific response data portion of the RPC response buffer, the adaptively generated wait hint generated at the messaging server, the adaptively generated wait hint being an indication that the messaging server was unable to process the data request and indicating that the computer system is to wait a specified wait time before sending another data request requesting the message related data for the user, the adaptively generated wait hint generated by a wait hint generation algorithm at the server, the wait hint generation algorithm configured to:
refer to external configuration data to adaptively generate a wait hint each time the data request is received at the messaging server but not processed, each wait hint generated by the messaging server based on the message server tracking how many times the data request was previously received at the messaging server but not processed, up to a specified number times the messaging server detects that the data request is received at the messaging server but not processed at the messaging server, after which the messaging server processes the data request to return message related data in response to the data request such that the message server controls when data requests are processed even when the messaging server is busy, the specified number of times being stored in the external configuration data;
wait the specified wait time before resending the data request requesting message related data for the user to thereby reduce the load on the messaging server; and
resend the data request subsequent to waiting the specified wait time.

26. A computer program product for use at a computer system that is network connectable to a plurality of clients, the computer system configured to process client data requests for data maintained at the computer system and return appropriate data to corresponding requesting clients, the computer program product for implementing a method for regulating client requests so as to provide an improved user experience when the messaging server is experiencing increased load, the computer program product comprising one or more computer storage media having stored thereon computer-executable instructions that, when executed by a processor, cause the computer system to perform the following:

receive a client data request from a client, the client data request requesting that message related data for a user of the client be returned to the client;

determine that the computer system is unable to process the client data request, subsequent to receiving the client data request based on the current load of computer system, the current load indicative of resource consumption at the computer system as a result of the computer system sending message related data to other clients from among the plurality of different clients, the determination made subsequent to receiving the client data request;

adaptively generate a wait hint for return to the client, the adaptively generated wait hint including an indicated wait time, the wait time indicating an amount of time that to the client that the client is to wait before resending the client data request to thereby reduce the load at the computer system, the adaptively generated wait hint generated by a wait hint generation algorithm, the wait hint generation algorithm configured to:

refer to external configuration data to adaptively generate a wait hint each time the client data request is received at the messaging server but not processed at the messaging server based on the messaging server tracking how many times the client data request was previously received but not processed, up to a specified number of times the messaging server detects that the client data request is received at the messaging server but not processed at the messaging server, after which the messaging server processes the client data request to return the message related data in response to the client data request such that the message server controls when delayed client data requests are eventually processed even when the messaging server is busy, the specified number of times being stored in the external configuration data; and send data responsive to the client data request in a Remote Procedure Call (RPC) response buffer to the client, the RPC response buffer having a plurality of data fields, including an error code field and a response data field, the error code field containing a server busy error code, the server busy error code indicating that the messaging server did not process the client data request, the response data field containing the adaptively generated wait hint, the response data field included in a variable length operation specific response data portion of the RPC response buffer, the adaptively generated wait hint indicating to the client to wait the indicated wait time before resending the client data request.

27. The method as recited in claim 1, wherein receiving a server response including an adaptively generated wait hint comprises an act of receiving an adaptively generated wait hint having an indicated wait time differing from the indicated wait hint time the wait hint generation algorithm is configured to generate for other attempts, in the plurality of attempts, to request the user data, the differing wait time read from a wait interval configuration file.

\* \* \* \* \*